United States Patent
Pitta' et al.

(10) Patent No.: US 12,181,429 B2
(45) Date of Patent: Dec. 31, 2024

(54) APPARATUS TO OPERATE A QUALITY CONTROL IN INDUSTRIAL PRODUCTION LINES, CORRESPONDING METHOD AND COMPUTER PROGRAM PRODUCT

(71) Applicant: DE.TEC.TOR S.R.L., Turin (IT)

(72) Inventors: Giuseppe Pitta', Turin (IT); Vanessa La Rosa, Turin (IT)

(73) Assignee: DE.TEC.TOR S.R.L., Turin (IT)

( * ) Notice: Subject to any disclaimer, the term of this patent is extended or adjusted under 35 U.S.C. 154(b) by 83 days.

(21) Appl. No.: 17/599,339

(22) PCT Filed: Mar. 23, 2020

(86) PCT No.: PCT/IB2020/052687
§ 371 (c)(1),
(2) Date: Sep. 28, 2021

(87) PCT Pub. No.: WO2020/194165
PCT Pub. Date: Oct. 1, 2020

(65) Prior Publication Data
US 2022/0196578 A1    Jun. 23, 2022

(30) Foreign Application Priority Data

Mar. 28, 2019 (IT) .................. 102019000004671

(51) Int. Cl.
  *G01N 23/223*    (2006.01)
  *G01N 21/359*    (2014.01)
  *G01N 35/00*    (2006.01)

(52) U.S. Cl.
  CPC ......... *G01N 23/223* (2013.01); *G01N 21/359* (2013.01); *G01N 35/00613* (2013.01);
  (Continued)

(58) Field of Classification Search
  CPC ............... G01N 23/223; G01N 21/359; G01N 35/00613; G01N 2223/071;
  (Continued)

(56) References Cited

U.S. PATENT DOCUMENTS 5,808,906 A * 9/1998 Sanchez-Revuelta ....................... G01B 11/25
                                                                                            702/170
10,207,296 B2 * 2/2019 Garcia ..................... B07C 5/34
(Continued)

FOREIGN PATENT DOCUMENTS

| CN | 104335032 A | 2/2015 |
| CN | 105008898 A | 10/2015 |

(Continued)

OTHER PUBLICATIONS

International Search Report and Written Opinion of the ISA for PCT/IB2020/052687, mailed Jun. 25, 2020, 12 pages.
(Continued)

*Primary Examiner* — Christine S. Kim
(74) *Attorney, Agent, or Firm* — Nixon & Vanderhye P.C.

(57) ABSTRACT

An apparatus (20) for carrying out a quality control on industrial production lines (10), comprising one or more apparatuses (30, 40, 50) for the measurement of properties of a product sample (C) of the aforesaid industrial production lines (10), which supply respective one or more measurement signals, the apparatus (20) comprising a processing module configured for processing the one or more measurement signals and obtaining properties of the product sample (C), the quality control being carried out as a function of said properties of the product sample (C), said one or more apparatuses (30, 40, 50) for the measurement of properties of a product sample (C) comprising: an x-ray fluorescence apparatus (30) that comprises an x-ray source (331), which emits a first x-ray beam (XB, XBC) towards
(Continued)

the product sample (C) in a measurement environment, and a particle detector (335), which is configured for receiving a second x-ray beam (XBR) scattered by the product sample (C) and generating a first received signal supplied within the set of said respective one or more measurement signals. The apparatus (20) further comprises an optical-spectroscopy apparatus, preferably operating in the near infrared (40), which comprises a radiation source operating in the near infrared (NIR), which emits a first optleal-radiation beam towards a product sample (C), and an optical sensor for receiving a second optleal-radiation beam scattered by the product sample (C) and generating a second received signal supplied within the set of said respective one or more measurement signals.

17 Claims, 5 Drawing Sheets

(52) U.S. Cl.
CPC . *G01N 2223/071* (2013.01); *G01N 2223/076* (2013.01); *G01N 2223/643* (2013.01); *G01N 2223/645* (2013.01)

(58) Field of Classification Search
CPC ....... G01N 2223/076; G01N 2223/643; G01N 2223/645; G01N 2223/3308; G01N 2223/623
See application file for complete search history.

(56) References Cited

U.S. PATENT DOCUMENTS

| | | | |
|---|---|---|---|
| 2002/0094058 A1 | 7/2002 | Kaiser et al. | |
| 2003/0039388 A1* | 2/2003 | Ulrich | G01B 11/2518 382/145 |
| 2006/0086901 A1* | 4/2006 | Price | G01N 21/6402 378/45 |
| 2011/0096898 A1* | 4/2011 | Kharchenko | G01N 23/207 378/70 |
| 2013/0077747 A1 | 3/2013 | Kamono et al. | |
| 2014/0044239 A1* | 2/2014 | Gendreau | H05G 1/70 378/123 |
| 2017/0014868 A1 | 1/2017 | Garcia, Jr. et al. | |
| 2017/0298219 A1 | 10/2017 | Vorst et al. | |
| 2017/0307551 A1 | 10/2017 | Murakami | |
| 2018/0100848 A1* | 4/2018 | Kastner | G01N 11/00 |
| 2022/0317051 A1* | 10/2022 | Veikkolainen | G01N 21/59 |

FOREIGN PATENT DOCUMENTS

| | | | | |
|---|---|---|---|---|
| CN | 106841171 A | 6/2017 | | |
| CN | 108136445 A | 6/2018 | | |
| EP | 766083 A2 * | 4/1997 | ........... G01N 23/223 |
| EP | 1 650 546 | 4/2006 | | |
| JP | S62-64977 A | 3/1987 | | |
| JP | 2013-070867 A | 4/2013 | | |
| JP | 2017-194360 A | 10/2017 | | |
| JP | 2019-032214 A | 2/2019 | | |
| WO | 2015/085372 A1 | 6/2015 | | |
| WO | 2015/195988 A1 | 12/2015 | | |
| WO | 2016/077869 A1 | 5/2016 | | |
| WO | 2017/011835 | 1/2017 | | |
| WO | 2019/049000 | 3/2019 | | |
| WO | WO-2019049000 A1 * | 3/2019 | ......... G01B 11/0608 |

OTHER PUBLICATIONS

Office Action dated Nov. 21, 2023, issued in China Application No. 202080039227.0, 9 pages.
Communication pursuant to Article 94(3) EPC dated Dec. 13, 2023, issued in European Application No. 20720121.1, 4 pages.
Office Action dated Oct. 31, 2023, issued in Japan Patent Application No. 2021-560277, 6 pages.

* cited by examiner

APPARATUS TO OPERATE A QUALITY CONTROL IN INDUSTRIAL PRODUCTION LINES, CORRESPONDING METHOD AND COMPUTER PROGRAM PRODUCT

This application is the U.S. national phase of International Application No. PCT/IB2020/052687 filed 23 Mar. 2020, which designated the U.S. and claims priority to IT patent application No. 102019000004671 filed 28 Mar. 2019, the entire contents of each of which are hereby incorporated by reference.

TECHNICAL FIELD

The present disclosure relates to methods for quality control by means of spectroscopy techniques at various wavelengths (x-rays, infrared—IR—and/or near infrared—NIR, or visible light), and optionally artificial vision.

One or more embodiments may be applied in contexts of verification of compliance and quality control of materials, in particular in industrial production lines, for example industrial packaging lines.

TECHNOLOGICAL BACKGROUND

Production flows of products in various industrial sectors, amongst which, for example, that of production of foodstuff packaging or of the foodstuffs themselves or of the raw materials used, envisage sample checks, namely, analysis of a certain percentage of the products taken from the production line, for example chemical analysis carried out in the laboratory using destructive techniques.

Figure 1:
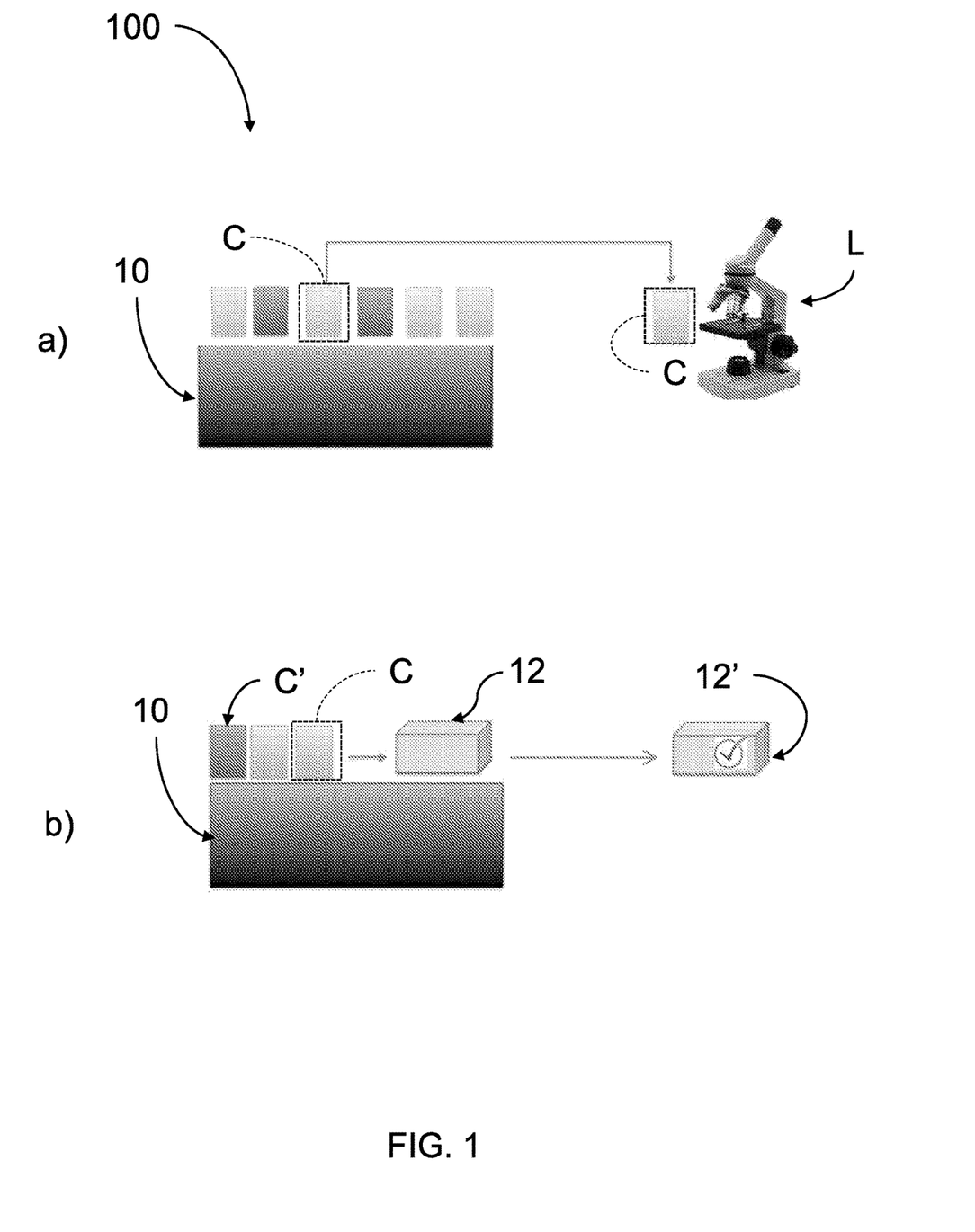

FIG. 1 is exemplary of a conventional quality-control procedure 100 on a production line 10, which may comprise:
- a stage of destructive sample checks, as exemplified in portion a) of FIG. 1; and
- a stage of selection of compliant and non-compliant products on the basis of the sample checks made in the previous stage, as exemplified in portion b) of FIG. 1.

As illustrated in FIG. 1, a sample C may be taken at random from the production line 10 and sent to a laboratory L. Following upon analysis, the laboratory L provides indications on the compliance or otherwise of the sample C to the production parameters.

In a subsequent stage, a lot 12 from which the sample has been taken can be labelled as "compliant" on the basis of a favourable opinion by the laboratory L on that sample C.

However, if the sample C deemed suitable from the laboratory analyses L is comprised in a lot 12 that includes a non-compliant sample C', this non-compliant sample C' may be erroneously labelled as compliant 12'.

Such a quality-control procedure 100 has a limit represented by the fact that, notwithstanding the checks, it is possible for non-compliant products C', 12' to end up on the market in so far as they belong to one or more lots 12' of the production line 10 deemed compliant according to the laboratory analyses L carried out on the sample C.

In order to guarantee that each single product is analysed before proceeding to the subsequent production stage or before being introduced on the market, it is hence desirable to:
- identify the product; and
- favour traceability of the products in their various production stages.

Some spectroscopy techniques can be used as non-destructive analysis techniques as a partial support of production. In this framework, a sample irradiated with electromagnetic waves at different wavelengths responds to the stimulus by emitting a characteristic electromagnetic radiation, which is analysed with such spectroscopy techniques.

In particular, among the above spectroscopy techniques it is known to use x-ray fluorescence (XRF), which can be employed using portable contact devices, thus making it possible to know the elementary composition of a sample via analysis of the electromagnetic radiation emitted.

Analysis is performed on a sample prepared for measurement. XRF spectrophotometry analyses are, for example, usually carried out with a static sample, namely, a sample that is not moving, in contact and at room temperature. In addition, it may be necessary to pre-treat the sample for carrying out the measurement.

Application of non-destructive analysis techniques is thus limited to the conduct of sample tests on material that is stationary alongside the production line, not enabling a chemical or molecular analysis to be carried out on a continuous production flow.

The product that is to be analysed may be characterized by different shapes, variable thicknesses, and different materials. The product may also present a layered structure of a certain thickness, as, for example, in the case of a foodstuff product within its packaging.

Consequently, known solutions, which amount to sample tests conducted on material stationary alongside the production line at room temperature and in contact, present limits that do not allow a chemical analysis to be conducted on a continuous production flow.

Object and Summary

The object of embodiments described herein is to improve the apparatuses and methods according to the prior art, as discussed previously.

Various embodiments achieve the above object thanks to an apparatus having the characteristics recalled in the ensuing claims.

The claims form an integral part of the technical teachings provided herein in relation to the invention.

In particular, according to one or more embodiments, such an object may be achieved by means of an apparatus for quality control on industrial production lines.

One or more embodiments may envisage procedures comprising one or more sets of spectroscopic techniques (vision, NIR, and XRF) for simultaneous measurements of one or more sets of quantities, for example one or more portions of the electromagnetic spectrum.

One or more embodiments may regard a method of operating (or performing) a quality control in corresponding industrial production lines.

One or more embodiments comprise an apparatus for carrying out a quality control on industrial production lines, comprising one or more apparatuses for the measurement of properties of a product sample of said industrial production lines, which supply respective one or more measurement signals, said apparatus comprising a processing module configured for processing said one or more measurement signals and obtaining properties of said product sample, said quality control being carried out as a function of said properties of said product sample, said one or more apparatuses for the measurement of properties of a product sample comprising:
- an x-ray fluorescence apparatus, including an x-ray source, which emits a first x-ray beam towards said product sample in a measurement environment, and a particle detector, which is configured for receiving a second x-ray beam scattered by said product sample and generating a first received signal supplied within said respective one or more measurement signals.

Such an apparatus further comprises an optical-spectroscopy apparatus, in particular, operating in the infrared (IR), for example in the near infrared (NIR), which comprises an infrared optical-radiation source that emits a first radiation beam towards a product sample, an optical sensor for receiving a second beam of optical radiation scattered (for example, by Raman scattering so as to facilitate direct measurements in aqueous solutions for in vivo study of biological systems) by said product sample and generating a second received signal supplied within said respective one or more measurement signals. For instance, the above optical-spectroscopy apparatus may be of the infrared (IR) type, namely, operating in a band of wavelengths of optical radiation comprised between 700 nm and 1 mm (1 nm=1 nanometre=$10^{-9}$ m; 1 mm=1 millimetre=$10^{-3}$ m). Preferably, the optical-spectroscopy apparatus operates in the region of the electromagnetic spectrum referred to as near infrared (NIR), namely, in a band of wavelengths of electromagnetic radiation comprised between the 700 nm and 2500 mm.

It should be noted that what is discussed mainly in the framework of IR/NIR optical spectroscopy may also be applied to optical spectroscopy in other frequency bands of the electromagnetic spectrum used in the field of analytic chemistry. For instance, the use of sources in the region of the spectrum of visible light or ultraviolet (UV) light between 200 nm and 700 nm can facilitate quantitative determination of analytes, amongst which, for example, ions of transition metals, conjugated compounds, and biological macromolecules.

The embodiments further comprise a "vision" system for image acquisition and processing, which comprises, for example, a video camera and a corresponding control and image-processing system.

One or more embodiments may comprise a method of carrying out a quality control of industrial production lines, including:
  providing one or more embodiments of the above apparatus;
  defining a set of significant parameters that enable recognition of said one or more samples of product being processed in a given time interval;
  receiving at least two signals, for example, a first signal, a second signal, and a third signal; and
  analysing said at least two signals as a function of said set of significant parameters.

One or more embodiments may facilitate making of non-destructive measurements on a sample, at different depths and during movement of the sample, for example to enable data to be obtained both on a packaging and on the contents of the packaging.

One or more embodiments may comprise a computer program product that can be loaded into the memory of at least one processing circuit (for example, a computer) and comprises portions of software code for executing the steps of the method when the product is run on at least one processing circuit. As used herein, it may be understood that reference to such a computer program product is equivalent to reference to a computer-readable medium containing instructions for controlling the processing system in order to co-ordinate implementation of the method according to one or more embodiments. Reference to "at least one computer" is intended to highlight the possibility of one or more embodiments being implemented in modular and/or distributed form.

The claims form an integral part of the technical teaching provided herein with reference to the embodiments.

BRIEF DESCRIPTION OF VARIOUS VIEWS OF THE DRAWINGS

One or more embodiments will now be described, purely by way of example, with reference to the annexed drawings, wherein:

FIG. 1 is discussed in the foregoing;

DETAILED DESCRIPTION OF EXAMPLES OF EMBODIMENTS

In the ensuing description, one or more specific details are illustrated in order to enable an in-depth understanding of examples of embodiments of the present description. The embodiments may be obtained without one or more of the specific details or with other methods, components, materials, etc. In other cases, known operations, materials, or structures are not illustrated or described in detail so that certain aspects of the embodiments will not be obscured.

Reference to "an embodiment" or "one embodiment" in the framework of the present description is intended to indicate that a particular configuration, structure, or characteristic described with reference to the embodiment is comprised in at least one embodiment. Hence, phrases such as "in an embodiment" or "in one embodiment" that may appear in one or more points of the present description do not necessarily refer precisely to one and the same embodiment.

Moreover, particular conformations, structures, or characteristics may be combined in any adequate way in one or more embodiments.

The references used herein are provided merely for convenience and hence do not define the sphere of protection or the scope of the embodiments.

Figure 2:
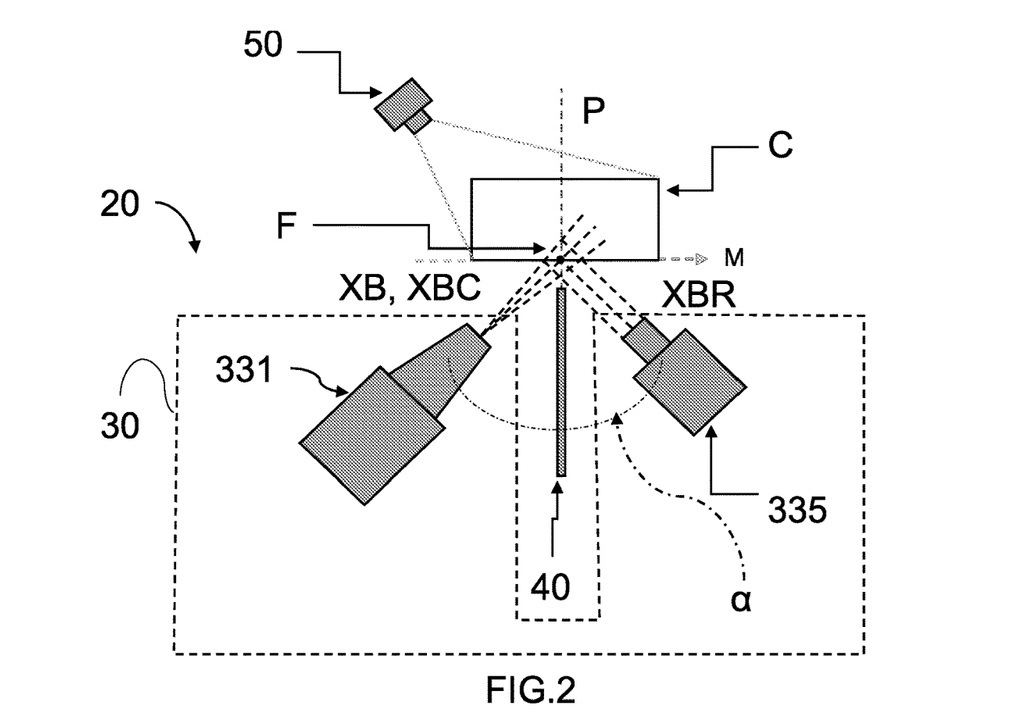
FIG. 2 shows a diagram of a quality-control apparatus, as discussed herein.

FIG. 2 exemplifies a diagram of an apparatus 20 for verifying compliance and for quality control that uses a set of techniques of spectroscopy at various wavelengths and techniques of industrial vision 30, 40, 50, which are integrated in the apparatus 20. This diagram is represented from the point of observation corresponding to a point in space where the production line 10 can be installed.

Such an apparatus 20 facilitates detection of the chemical and molecular composition, as well as of possible macroscopic defects, of products moving along the production line 10. The apparatus 20 may comprise a variable number of systems and corresponding techniques, which are illustrated in the following, for example either a full set of the techniques illustrated or a reduced subset.

It should be noted that a configuration of the apparatus comprising a certain number of techniques is discussed in the following. However, it is to be noted that these techniques may even be used at different moments, not necessarily all together, and likewise that the components may be present in different stages.

An embodiment of the above apparatus 20, as may be seen, for example, in FIG. 2, comprises:
- an x-ray fluorescence spectroscopy apparatus, in brief XRF apparatus 30, which includes an x-ray source 331 and an x-ray detector 335; and
- an infrared (preferably near-infrared) optical-spectroscopy apparatus 40.

Optical spectroscopy, mainly in the NIR spectrum, is in general employed using benchtop instruments located alongside the production line, facilitating analysis of molecular composition of a sample through the study of the electromagnetic radiation emitted.

Embodiments further comprise an image acquisition and processing system 50, for example comprising a video camera and a corresponding control and image-processing system. Systems comprising vision instruments, for example two-dimensional (2D) vision instruments, enable proper identification of the presence of macroscopic defects on moving samples. Nevertheless, use of these vision systems in the control systems of production lines per se, enables to discard samples due to non-compliance only on the basis of an analysis of the outside of the product and not on the basis of an analysis of a chemical type.

The optical-spectroscopy apparatus 40 may comprise, in general:
- an optical head, which includes a source of light in one or more bands of the electromagnetic spectrum, for example in the frequency band of the electromagnetic spectrum identified as near infrared;
- an optical sensor, for example an optical fibre, configured for receiving the signal emitted by the sample; and
- a spectrometer, configured for analysing the radiation emitted by the sample following upon irradiation with electromagnetic radiation from the source.

Figure 3:
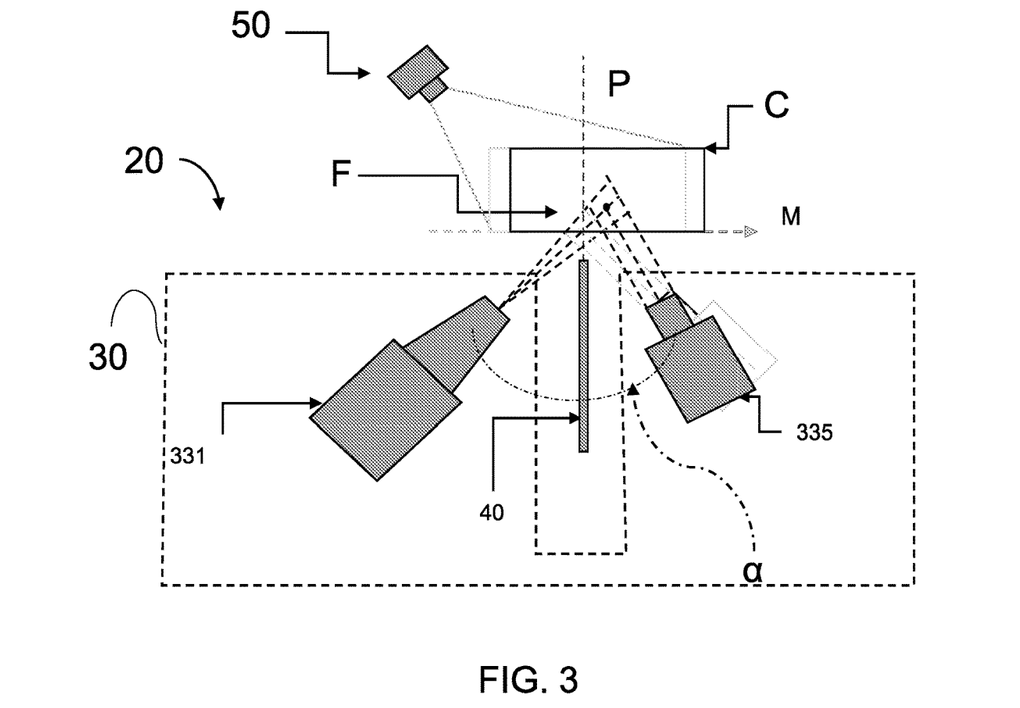
FIG. 3 shows operating principles of the apparatus of FIG. 2.

For instance, the spectroscopy apparatus may comprise an optical-fibre spectrophotometer, for example operating in the NIR band. In FIGS. 2 and 3, the reference 40 designates a portion of optical fibre, which can be used for sending an optical signal and collecting a reflected optical signal, which is then conveyed to the spectrometer.

The vision apparatus 50 illustrated comprises at least one video camera equipped with artificial-vision systems, which, for example, includes a dedicated image acquisition and processing system for tracking and/or determining geometrical properties of the objects. The vision apparatus 50, in one or more embodiments, may comprise a number of video cameras with different characteristics and vision systems, for example ones sensitive to infrared radiation.

The XRF apparatus 30, as illustrated in the example of FIGS. 2 and 3, comprises an x-ray source 331, in particular an x-ray tube 31, which emits an x-ray beam XB along a beam axis, towards a product sample C carried by the production line 10, for example on a conveyor belt, in a conveying direction M.

An x-ray beam XB or focused beam XBC of this sort reaches the product sample and is reflected, more precisely scattered, into a reflected x-ray beam XBR, along an axis of observation O. The reflected x-ray beam is collected and measured by the energy-dispersion solid-state particle detector 335, the axis of observation O of which in the example is aligned with the axis of observation O. In one or more embodiments, the x-ray source 331 and the detector 335 may comprise, between the source and the output, respective vacuum chambers, which face the product sample C through respective beryllium windows, not illustrated in FIG. 3, which close respective output and input terminal portions thereof that face the product sample C. Downstream of the x-ray tube 31 or of the detector 335 the x-ray beam XB can pass through a polycapillary-lens optical module, substantially comprising a polycapillary lens, the main axis of which is aligned with the axis of the beam, which is configured for carrying out a focusing of the x-ray beam XB into a focused beam XBC.

The XRF apparatus 30 further comprises a system 38 for variation of an angle α between the source 331 and the detector 335, configured for rotating the axes of incidence and observation, substantially about a respective axis of rotation of the source 331 and of the detector 335, which is perpendicular to the plane of the drawing (direction Y, as described more fully in the following) and passes through the terminal portion of the source 331 and the detector 335, respectively, so as to vary the aforesaid source-detector angle α.

By varying the source-detector angle α, it is possible to modify a depth d of the position of a measurement focus F so as to excite the atoms present on the sample C that is to be analysed, even in the case where these are located underneath an undesired thickness of surface material, without necessarily modifying the instrument-to-target distance and facilitating execution of measurements without contact with the product sample C in a continuous way.

The XRF apparatus 30 may furthermore comprise:
- a module for measuring the depth of the surface of the product sample C, in particular an optical interferometer;
- a shielding system, comprising a mobile element (for example, a shutter slide) set between the x-ray source 331 and the measurement environment and configured for intercepting a portion or the totality of x-rays XB, XBC, XBR; and
- a cooling system, for example a liquid and/or air-blade cooling system.

The interferometer, an axis of measurement of which, for example perpendicular to the plane of the product sample C, is designated by P, is used for measuring the depth of the profile of the surface of the product sample C. Via combined use of the information on the profile of the surface of the product sample C of the aforesaid interferometer 36 and of the system 38 for varying the angle between the source 31 and the detector face 35, it is possible to vary the source-detector angle α as a function of the defects of the sample, for example defects understood as surface undulation of the packaging of a foodstuff product or else also of a metal tray, which may vary in the course of measurement as the product C is moving.

The XRF apparatus 30 may be configured for following the product C along the axis of movement M.

Represented in FIGS. 2 and 3 are modalities of movement of the XRF apparatus 30 in the apparatus 20.

In FIG. 3, where the horizontal axis X, parallel to the axis of movement M, and the vertical axis Z are represented (the axis Y exits from the plane of the sheet and is not represented), it may be noted how such articulation pins, and hence the terminals are located at a short distance, for example of approximately one centimetre, above the surface of the sample C.

According to this first mode, the source 331 is displaceable in such a way that the axis of incidence of the x-ray beam XB varies an angle of incidence $\theta_i$ thereof, calculated between the axis of incidence I and a perpendicular axis of measurement P, by rotating. Likewise, the detector 335 can be displaced so as to align its own axis of observation O to a direction of observation $\theta_o$ to follow the consequent variation of inclination of the direction of reflection, and hence of an axis of reflection, of the beams. Hence, according to the first mode, described with reference to FIGS. 3a and 3b, it is envisaged to vary the angle of incidence $\theta_i$ and the angle of observation $\theta_o$, the sum of which determines the source-to-detector angle α, in a symmetrical way, namely, in such a way that they assume the same values. In this way, a focus F varies its own position along the axis Z, thus changing the depth d of the focus F, in the sample C, but remains, as horizontal co-ordinate, along the axis of measurement P.

According to a second mode, it is possible to vary the angle of incidence $\theta_i$ and the angle of observation $\theta_o$ independently of one another.

As illustrated in FIG. 3c, this causes the focus F to be located at a depth d, but displaced by a length W with respect to the position of the axis of measurement P when the angles are symmetrical, as in FIG. 2.

In this way, for example, it is possible to displace and incline the axis of observation in different ways to obtain different positions. As illustrated in FIG. 3b, by varying the source-detector angle α, which is the sum of the angle of incidence $\theta_i$ and the angle of observation $\theta_o$, if the focused x-ray beam XBC is focused in the focus F, the depth d of this focus F can be varied.

By varying the tube-to-detector angle α as exemplified in FIGS. 2 and 3, and exploiting the movement of the sample C along the production line 10 in the direction M, execution of a set of different measurements at different depths of the measurement focus F is facilitated, with the aim to excite the atoms present on the sample that is to be analysed and those of the possible packaging that contains it, without modifying the measurement angle and ensuring the possibility of making contactless measurements.

The apparatus 20 preferably comprises a housing that has pre-arranged positions for the components of each one from among the XRF apparatus 30, the optical-spectroscopy apparatus 40, and optionally the video camera 50. These pre-arrangements are such as to introduce the lowest amount of disturbances in the measurements. For instance, possibly the housing for the video camera 50 is such that this is not located in a position corresponding to the XRF detector 35, but rather is set so as to frame the lowest amount possible x rays emitted and thus avoid undergoing any damage.

The geometrical arrangement of the XRF apparatus 30, the optical-spectroscopy apparatus 40, and the artificial-vision apparatus 50 may be provided in the dedicated housing in such a way that it will be possible to exploit the phenomenon of amplification of the signal emitted by the sample when this is processed with more than one stimulation signal at a time, as discussed in the following.

Figure 4:
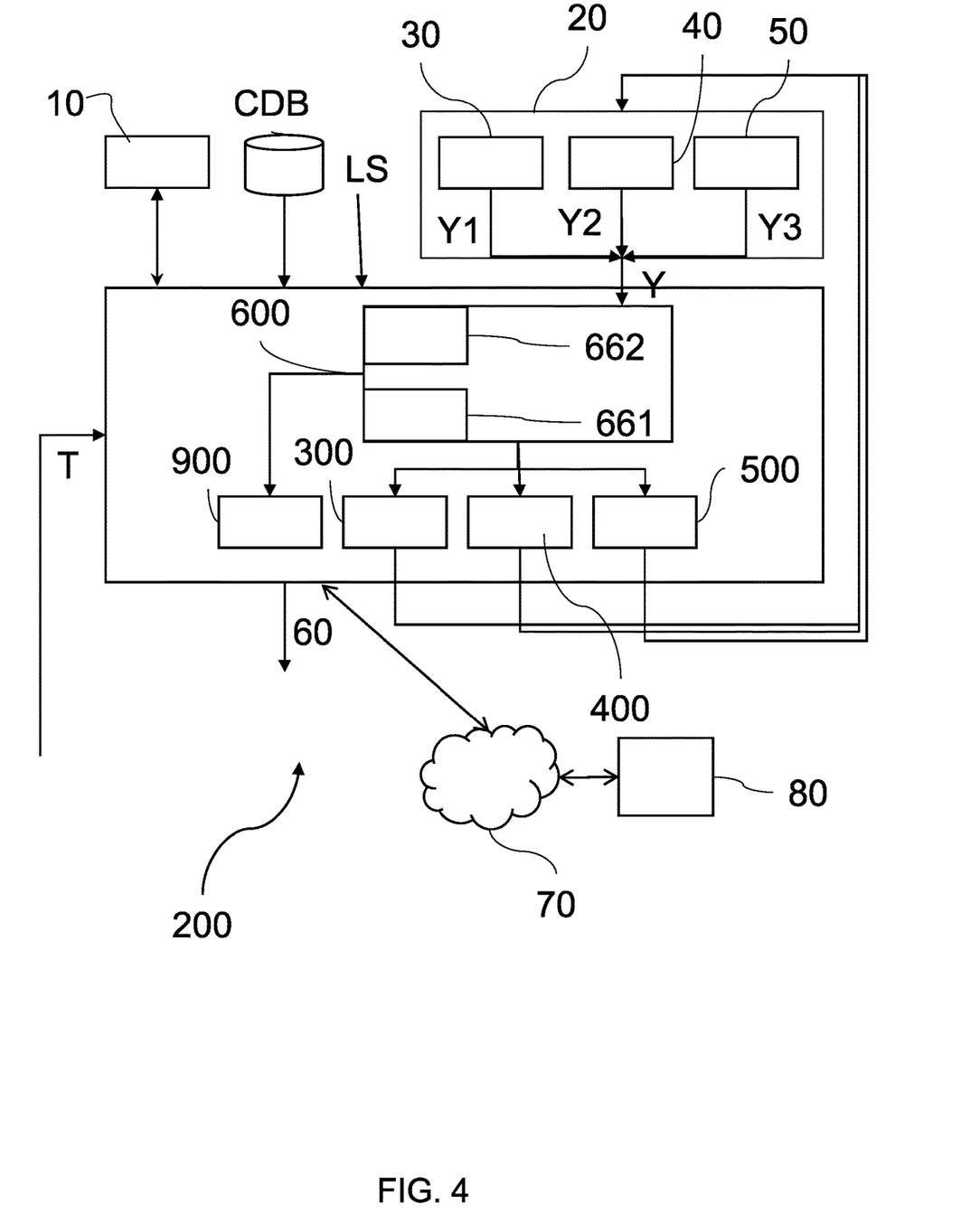
FIG. 4 is exemplary of a control system of a quality-control apparatus, as described herein.

FIG. 4 represents schematically a context of use of the apparatus 20 described herein.

The apparatus 20 operates under the control of a control system 200, which comprises:
- an XRF-control module 300, configured for controlling operation of the XRF system 30, namely, in particular of the source 331, the detector 335, the interferometer, and the system for varying the angle α;
- an optical-spectroscopy control module 400, configured for controlling operation of the optical-spectroscopy system 40, namely, in particular of the optical head, the optical sensor, and the spectroscope;
- a control module 500 for controlling the video camera 50, comprising dedicated image-processing stages;
- a data-processing module 600, which conveys the data of the measurements made, via at least one from among the XRF module, the optical-spectroscopy module, and the video camera, and processes them; and
- optional control modules 900 for controlling the associated systems, for example for controlling illumination of the environment surrounding the apparatus.

The data-processing module 600 receives at least one measurement signal Y from the apparatus 20, which comprises data gathered by at least one from among the XRF apparatus 30, the optical-spectroscopy apparatus 40, and the image-processing apparatus 50, and/or from the respective control modules 300, 400, 500 and is configured for supplying to user stages, for example via a user interface, the data gathered and/or processed, for example the molecular and chemical composition, and/or the geometrical characteristics of the element being examined.

The data-processing module 600 may comprise, as represented, a software analysis module 661, which receives the measurement signal Y of the apparatus 20 and analyses it to obtain a chemical composition 60 of the product sample C travelling along the production line.

The measurement signal Y may comprise a set of measurement signals coming from the respective apparatuses 30, 40, 50, for example:
- a first measurement signal Y1, coming from the XRF apparatus 30;
- a second measurement signal Y2, coming from the NIR optical-spectroscopy apparatus 40; and
- a third measurement signal Y3, coming from the video camera 50.

Given the importance of making the measurements on moving targets and in short times, compatibly with the speed of movement of the samples C, C', 12 along the production line 10, the data-processing module 600 may comprise artificial-neural-network processing stages, which are provided trained via a portion of a database CDB of measurements made on compliant and non-compliant samples.

For instance, the software analysis module 661 may receive at input a list LS of chemical elements or spectra (for example, in the NIR band) that are significant for recognizing the products being processed on the production line 10, for example referring to a given time interval, for instance over a day, a week, or a month. This list LS in general refers to a set that is reduced with respect to the set of chemical elements that can be identified by the apparatus 20, it being possible also for this list to be stored in the database CDB.

The software analysis module 661 is connected in a relationship of access to the database CDB, stored in the records of which are measurements made on the products being processed in the corresponding time interval or that can be processed on the production line.

The software analysis module 661, on the basis of the comparison of the measurement signal Y with the data of the database CBD, identifies the type of product C and supplies it to a decision module 662, which, on the basis of thereof, issues a command to the production line 10 to perform an action. For instance, if a sample C' travelling is of an unexpected (or non-compliant) type, it can govern branching points downstream of the inspection point in which the apparatus 20 operates in order to select and/or convey the unexpected (or non-compliant) product C' towards a rejection branch so as to prevent mixing of expected (or compliant) products with unexpected (or non-compliant) products or in any case products of a different type.

It should be noted that the control system 200 also receives a synchronization signal T from the production line;

in other words, for example, a signal provides the timing at which the samples appear on the line 10 so as to be able to synchronize the measurement operations with the times of the production line.

The control system 200, in this regard, is also configured for controlling, for example via the decision module 662, a robot manipulator, which moves the apparatus 20, for example by varying the orientation and position of the latter along the production line 10, according to the requirements of measurement and operation of the production line 10.

With the apparatus 20 described, it is possible to carry out control, for example via the module 200 that controls the line 10, in any point of the production line 10, for example at the start or end of a product processing, in the presence of an articulated joint. In general, there are in any case no limits to the number of inspection points that can be used on the lines.

The control system 200 is moreover connected, through a network 70, which may be the Internet or a mobile-phone network or a communication network of some other type, to terminals 80, personal computers, and/or smartphones and/or tablets, which are provided with applications for communicating with the control system 200 both for displaying data and for sending commands.

The software analysis module 661 is in general configured for executing the following functions on the measured signal Y:
  acquisition;
  correction;
  smoothing;
  noise removal;
  detection of characteristic peaks of the spectrum obtained from the measured signal Y;
  nonlinear operations of fitting of the data of the spectrum;
  integration of the peaks;
  calculation, from the value of the peak integral, of concentrations of chemical elements to determine the chemical composition of the sample measured; and
  comparison of measured chemical compositions c with compositions stored in the database DCB, in particular in order to recognize the type C of product.

In a similar way, the information obtained from the spectrum of the measurement signal Y1 can be used for excluding or confirming the presence of molecules containing given elements.

In variant embodiments of the solution described herein, not necessarily may all the operations discussed be present in the analysis; for example, one or more of the operations of correction, noise smoothing, and noise removal may not be present. Notwithstanding this, a possible embodiment comprises the operations referred to above in the order of presentation.

Hence, the apparatus 20 described may be installed on a production line 10 along the various processing lines, for example prior to each branching, at the start and/or at the end of each different processing line.

As has been said, the apparatus 20 facilitates the task of carrying out chemical and molecular analysis and recognition of moving targets. It is thus necessary to complete measurement in short times.

It is envisaged, for this purpose, to provide the apparatus 20, prior to measurement, with an indication on which are the chemical and molecular elements significant for discriminating the different types of product C being processed, namely, the list LS. This makes it possible to carry out in shorter times recognition of the type of product being processed and thus prevent problems of mixing between the different types of products.

For instance, consider the case where the presence or otherwise of a molecule containing an element with a given atomic number, for example sulphur, is to be verified. The spectrum of the molecule being examined might not be delineated in a sufficiently clear way in the spectrum acquired by the (NIR) optical-spectroscopy apparatus 40, namely, the second signal Y2, since the excitation signal has a power inadequate for detecting the molecule. Hence, it is possible to envisage activation, via the XRF-control module 300, of the XRF system. Consequently, if the analysis of the first measurement signal Y1 coming from the XRF apparatus 30 confirms the presence or absence of sulphur, it is then possible to confirm with greater certainty the presence or absence of the element and of the molecule being examined.

According to another example, with the apparatus also comprising the artificial-vision system 50, the (IR and/or NIR) optical-spectroscopy apparatus 40 is used for detecting, by working on the second measurement signal Y2 via the processing module 600, a type of matrix or a molecular composition, for example one with a heavy or light matrix.

Hence, the optical-spectroscopy apparatus 40 (in particular, operating in the IR/NIR band), through analysis of the different functional groups, may be used, for example, for: separating the different plastic materials used (PE, PP, PVC, PS, PET) in recycling processes; identifying the nutritional content of a foodstuff (proteins, fat, water), to identify the origin thereof; and identifying organic contaminants and mycotoxins in foodstuff matrices and in plastics for food purposes.

It should be noted that, foodstuff-packaging lines are a non-limiting example of application of the solution discussed therein. This application is adopted purely by way of example and in no way limits the sphere of protection.

At the same time, the artificial-vision apparatus 50 provides indications on the geometry on the basis of the measurement signal Y3 processed by the control module 500 of the video camera 500; for example, it is configured for detecting the thickness of the product. Consequently, the XRF apparatus can be set, via the XRF-control module 300, by setting values of energy and current such as to facilitate optimization of reduction of the background noise and set the measurement focus F. For a same optimization objective, further values may be set, such as amplitude values, power distribution, etc.

As has been anticipated, the control module 200 is configured for driving the XRF source 331 and the optical-radiation source 40 via respective control modules 300, 400 so that they will emit radiation, in the respective spectral-emission bands, in one and the same period or at one and the same moment. In this way, the second measurement signal Y2, generated by the vibrations of the molecules stimulated by the radiation coming from the optical-radiation source 40, can be amplified via stimulation of the molecules by the x-rays emitted by the XRF source 331, which extract electrons from the atoms of these molecules. Hence, the signal-to-noise ratio of the second measurement signal Y2 supplied by the optical-spectroscopy apparatus 40, in particular when it is operating in the NIR frequency band, can be improved by simultaneous irradiation of the sample with x-ray signals that modify the NIR emission that would be emitted in the absence of the aforesaid co-stimulation. In other words, the apparatus 20, in particular through its module 200, is configured for driving the x-ray source 331 and the NIR-radiation source to emit, respectively, the x-ray beam XB towards the product sample C and the NIR-radiation beam towards the same product sample C at one and the same time.

Consequently, on the basis of what has been described, the apparatus 20 for carrying out quality control on industrial production lines 10 comprises one or more apparatuses 30, 40, 50, HZ for the measurement of properties of a product sample C of the aforesaid industrial production lines 10, which supply respective one or more measurement signals, namely, Y1, Y2, Y3, YZ, and a processing module, for example the module 600 or a plurality of processing modules, configured for processing the measurement signals Y1, Y2, Y3, YZ and obtaining properties, such as the chemical composition 60 or dimensional parameters, of the aforesaid product sample C. Quality control is carried out as a function of the above properties of the product sample C. The measurement apparatuses 30, 40, 50, HZ comprise the x-ray fluorescence apparatus 30, which generates the first received signal Y1, namely, a measurement signal, which is then supplied, within the set of said respective one or more measurement signals Y1, Y2, Y3, YZ, in particular to the module 600. In addition, in one embodiment, the apparatus also comprises at least one optical-spectroscopy apparatus 40, preferably operating in the near infrared, which includes the radiation source, for example the optical source operating in the near infrared, which emits the first radiation beam towards the product sample C, and the optical sensor, for receiving the second radiation beam (for example, in the NIR band) scattered (for example, by Raman reflection or scattering) by said product sample C and generating, accordingly, the second received signal Y2, namely, a measurement signal, which is supplied within the set of said respective one or more measurement signals Y1, Y2, Y3.

It should be noted that, as has been illustrated, the apparatus is configured for supplying the second received signal Y2 within the set of said respective processed measurement signals Y1, Y2, Y3 for obtaining properties 60, for example the chemical and/or molecular composition and/or the dimensions, of said product sample C and carrying out quality control, for example verification of compliance with respect to values of given parameters, as a function of said properties 60. In addition or as an alternative, as has been illustrated, the second received signal Y2 can be used for driving the x-ray fluorescence apparatus 30, namely, in particular, for instance, enabling emission by said x-ray fluorescence apparatus 30 (e.g., by activating/deactivating the source) as a function of given values assumed by the received signal Y2. The aforesaid enabling may, as has been said, envisage opening of a shutter.

As has been said previously, during supply of the second received signal Y2 within the set of said respective measurement signals Y1, Y2, Y3 it is possible to exploit in a combined and simultaneous way the presence of the apparatuses 30 and 40 by carrying out, as has been said, simultaneous irradiation of the sample with x-ray signals that modify the optical emission, in particular in the IR or NIR band, that would be obtained in the absence of the aforesaid co-stimulation.

Processing 600 of the second measurement signal Y2 coming from the optical-spectroscopy apparatus 40, together with the third measurement signal Y3 received from the video camera 50, facilitate conduct of a combined analysis of the type of material of the sample and of the geometrical characteristics, for example the thickness, of the sample C. The signal produced by this processing operation can then be supplied to the control system of the XRF apparatus 300 to facilitate optimization of the parameters such as intensity and/or energy, and/or current, and/or power distribution of the x-ray tube, for instance in order to improve performance of the measurement and reduce the radiation transmitted beyond the sample itself and the corresponding dose. This strategy also facilitates preservation of the integrity of the vision apparatus 50. For instance, analyzing the second measurement signal Y2 of the apparatus 40 facilitates detecting whether a product has a light or heavy matrix, or even foresee, from the type of matrix, whether elements of the product have a high or low atomic number, while, from the third measurement signal Y3, it is possible to obtain the thickness of the product.

Hence, in one embodiment, the apparatus described may comprise controlling, by means of the module 300, the XRF apparatus 30 via at least one of the following:

a value of length of a geometrical dimension of the object measured through the vision apparatus 50; and an order of magnitude of the (expected) atomic number of an object measured through the optical-spectroscopy apparatus 40, preferably operating in IR and/or NIR band.

The second measurement signal Y2 coming from the optical-spectroscopy apparatus 40 can be supplied to the XRF-control module 300 as signal for triggering opening and closing of the shutter slide of the XRF apparatus 30 so as to enable limitation of emission of ionizing x-ray emission to the period of effective presence of a sample C on the production line 10.

Operating the apparatus 20 in a self-shielding way according to the method illustrated comprises in one embodiment:

supplying the measurement signal Y2 to the XRF-control module 300, thus detecting passage of the sample C;

supplying the measurement signal Y3 coming from the artificial-vision system 50 to the XRF-control system 300, thus providing information on the geometrical characteristics of the sample C, for example the thickness;

governing 300 opening of the shutter of the XRF apparatus 30 via the XRF-control module 300 as a function of the measurement signal Y2 coming from the optical-spectroscopy apparatus 40, for example when the values in the signal Y2 indicate the presence a sample C in position, namely, interposed along the beam generated by the source of the optical-spectroscopy apparatus 40, which, for example, causes a sudden drop in transmittance, in particular below pre-set thresholds; and setting the parameters, for example the intensity (or the energy, power distribution, current, etc.), of the x-ray source 331 of the XRF apparatus 30 as a function, e.g., of the thickness of the sample C; for instance, in such a way, the radiation may be absorbed by the sample and does not propagate in an undesirable way in the environment, favouring reduction of the x-radiation parasitically received by the video camera 50, thus reducing the disturbances thereof.

The performance of the video camera 50 and/or of the optical-spectroscopy apparatus 40 may be markedly affected by the amount of light present within the measurement environment, which is the same for all the measurement apparatuses comprised in the apparatus 20.

In particular, it should be noted that the performance of the optical-spectroscopy apparatus 40 improves in conditions of absence of environmental light, namely, in conditions of darkness. Instead, the performance of the video camera 50 improves in conditions of good environmental light that favour visibility. The solution described herein comprises the possibility for the accessory control modules 900 to be governed to drive an environmental-light source, for example external to and/or integrated in the apparatus, to supply a monochromatic environmental light to be irradiated in the measurement environment, for example a blue light. Supply of a monochromatic light 900 to illuminate the environment introduces a background noise signal that can be easily filtered, for example subtracted, from the spectrum of the second measurement signal Y2 and at the same time enables good processing of the image by the artificial-vision apparatus 50.

Figure 5:
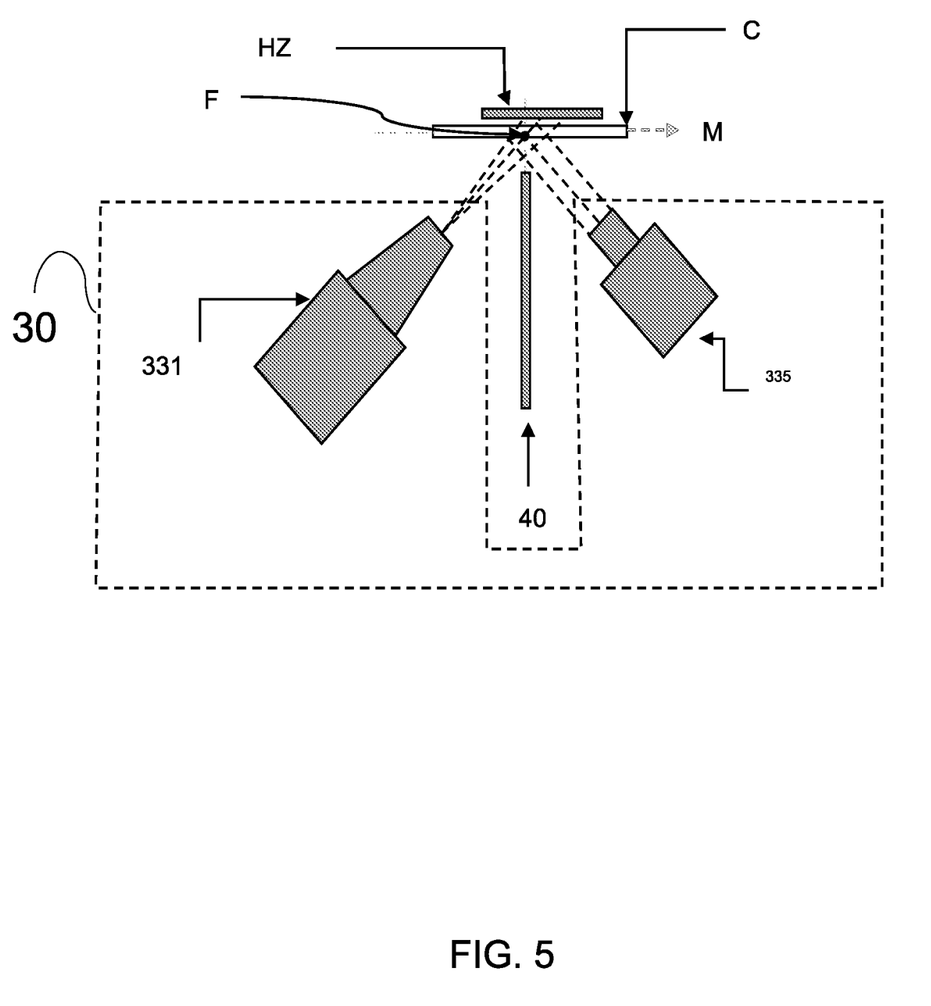
FIGS. 5 and 6 show diagrams of one or more alternative embodiments, as described herein.
Figure 6:
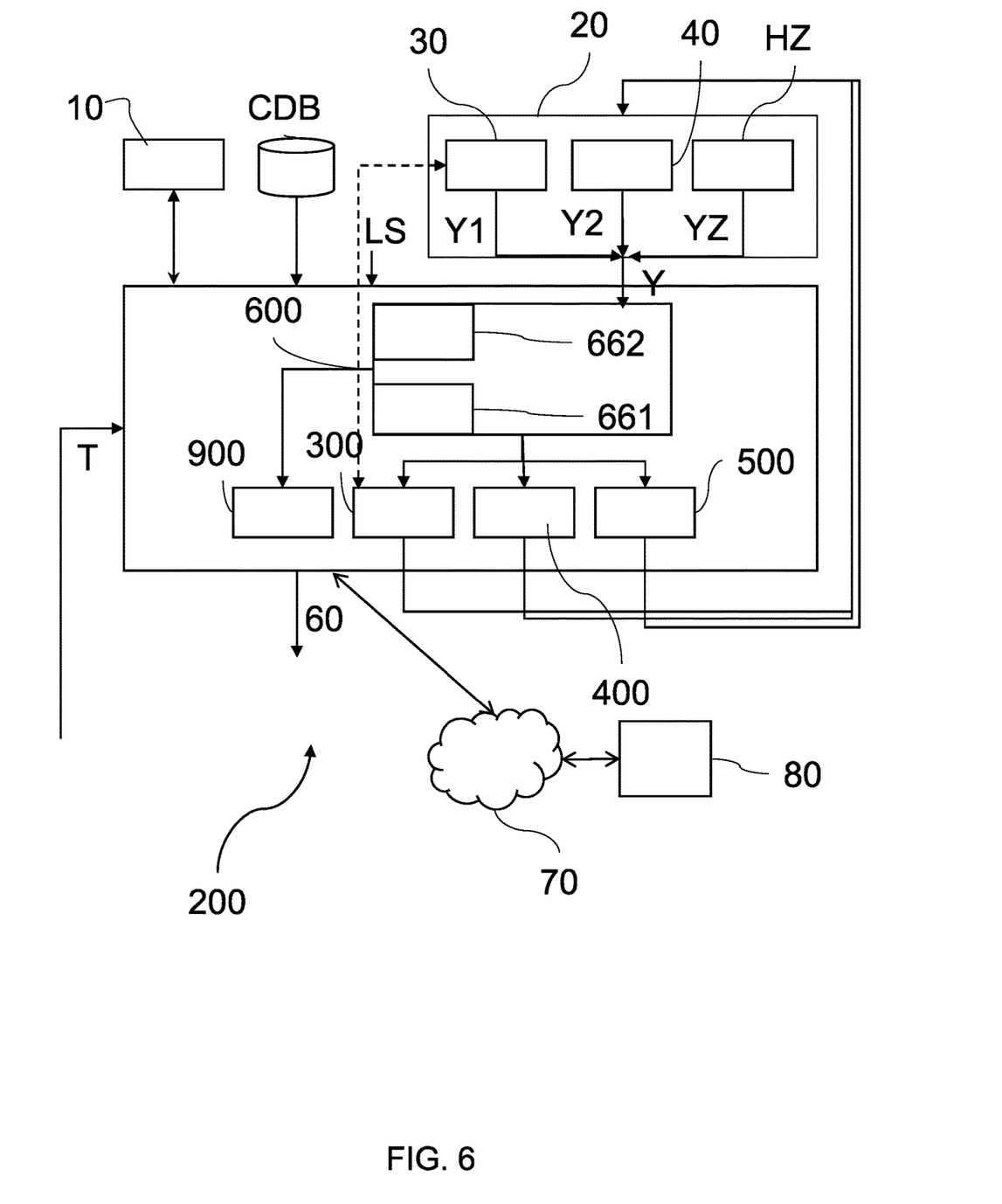

In a variant embodiment, as exemplified in FIGS. 5 and 6, the apparatus 20 may comprise at least one further target with high atomic number HZ located beyond the distal surface of the sample C and along the trajectory of the irradiation beam XBC and/or detection beam XBR.

The presence of a high-atomic-number and/or radio-luminescent target HZ set behind the sample C enables determination of whether primary radiation has been scattered in an undesirable way beyond the sample C itself, since in this case this excess primary radiation comes to hit the target HZ. This excess radiation that possibly hits the target HZ can be detected, for example, by:

- the detector 335, which detects a signal YZ that contains the characteristic spectral lines of the excess radiation; and/or
- the artificial-vision apparatus 50, for example by virtue of the radioluminescence phenomenon.

In other words, the apparatus comprises a material with high atomic number HZ or a radio-luminescent material configured for absorbing at least a portion of the first x-ray beam BC that has traversed the product sample C and generating a respective received signal YZ that can be analysed for driving the x-ray fluorescence apparatus 30.

The signal YZ detected by the detector in this condition can be supplied once again to the control module 300 as feedback signal and provide a radio-protection interlock in order to verify that there are effectively no photons X beyond the sample C.

Via the XRF-control module 300, regulation of the current intensity of the XRF tube 30 is hence facilitated so as to reduce the x-radiation dispersed in the environment, for example by reducing the intensity of the radiation until no radiation hits the target element HZ.

Without prejudice to the underlying principles, the details and the embodiments may vary, even appreciably, with respect to what has been described herein, purely to way of example, without thereby departing from the sphere of protection, as this is defined in the annexed claims.

As has already been mentioned, the apparatus for carrying out quality control on industrial production lines described herein uses an optical-spectroscopy apparatus operating in a frequency band in the range of optical frequencies, preferably, operating in the NIR range. However, this optical-spectroscopy apparatus can operate in other frequency bands of the electromagnetic spectrum used in the field of analytical chemistry in order to obtain in a similar way information on the molecular bonds (type and possibly amount thereof) of the product sample that is to undergo quality control, these frequency bands being comprised between the ultraviolet (UV) and the near infrared. For instance, use of sources in the region of the spectrum of visible light or ultraviolet light between 200 nm and 700 nm, can facilitate quantitative determination of analytes, amongst which, for example, ions of transition metals, conjugated compounds, and biological macromolecules.

Hence, the optical-spectroscopy apparatus preferably operates only in the NIR band, but alternatively it may also operate in the band or region of the spectrum of visible light or ultraviolet light between 200 nm and 700 nm, or else it may operate both in the band or region of the spectrum of visible light or ultraviolet light between 200 nm and 700 nm and in the NIR band.

The invention claimed is:

1. An apparatus for carrying out a quality control on industrial production lines, comprising one or more apparatuses for the measurement of properties of a product sample (C) of said industrial production lines, which supply respective one or more measurement signals (Y1, Y2, Y3; YZ), said apparatus (20) comprising a processing module configured for processing said one or more measurement signals (Y1, Y2, Y3; YZ) and obtaining properties of said product sample (C), said quality control being carried out as a function of said properties of said product sample (C), said one or more apparatuses for the measurement of properties of a product sample (C) comprising:

an x-ray fluorescence (XRF) apparatus comprising an x-ray source, which emits a first x-ray beam (XB, XBC) towards said product sample (C) in a measurement environment, and a particle detector, which is configured for receiving a second x-ray beam (XBR) scattered by said product sample (C) and generating a first received signal (Y1) supplied within the set of said respective one or more measurement signals (Y1, Y2, Y3, YZ), the apparatus further comprising:

an optical-spectroscopy apparatus, operating in a frequency band belonging to the range of optical frequencies, comprising an optical-radiation source, which emits a first beam of optical radiation towards a product sample (C), and an optical sensor for receiving a second beam of radiation scattered by said product sample (C) and generating a second received signal (Y2) supplied within the set of said respective one or more measurement signals (Y1, Y2, Y3; YZ), wherein the apparatus is configured for driving said x-ray source and said source of optical radiation to emit, respectively, an x-ray beam (XB) towards the product sample (C) and an optical-radiation beam towards the same product sample (C) at one and the same time, wherein said x-ray fluorescence (XRF) apparatus comprises an XRF-control module configured for driving the operation of modifying a position of a shielding system comprising a mobile element set between the x-ray source and the measurement environment comprising the product sample, wherein the apparatus comprises an artificial-vision apparatus, which includes an image acquisition and processing system configured for acquiring and processing images of said product sample (C) in said measurement environment and generating a third received signal (Y3) that can be analysed for classifying said product sample (C) and/or for driving said x-ray fluorescence apparatus, wherein the apparatus comprises a blue monochromatic environmental light source configured for illuminating said measurement environment.

2. The apparatus according to claim 1, wherein the apparatus is configured for supplying said second received signal (Y2) within the set of said respective one or more measurement signals (Y1, Y2, Y3; YZ) that are processed to obtain properties of said product sample (C) and carry out said quality control as a function of said properties.

3. The apparatus according to claim 1, wherein the apparatus is configured for driving operation of said x-ray fluorescence apparatus as a function of the values of said second received signal (Y2) generated in said optical-spectroscopy apparatus, in particular, for enabling emission by said x-ray fluorescence apparatus.

4. The apparatus according to claim 1, wherein the apparatus comprises
a module configured for driving said monochromatic environmental light source to illuminate the measurement environment, introducing a background noise signal suitable for being filtered from a spectrum of the second received signal (Y2) and for improving analysis of the third received signal (Y3) by the artificial-vision apparatus.

5. The apparatus according to claim 1, wherein the apparatus comprises a target (HZ) made of a material with high atomic number and/or a radio-luminescent material positioned beyond a distal surface of the sample (C) and along a trajectory of the first x-ray beam (XB, XBC) and/or second x-ray beam (XBR).

6. The apparatus according to claim 1, wherein said x-ray fluorescence apparatus comprises:
an XRF-control module configured for driving at least one of the following operations:
modifying an angle (α) between an axis of said first x-ray beam (XB) and an axis of observation of the detector in order to modify a position, in particular depth and/or horizontal position, of a focus (F) of said first x-ray beam (XB, XBC), and
varying an angle of incidence calculated between the axis of the beam (XB) and an axis (P) perpendicular to the surface of the product sample (C);
and a further sub-arrangement for displacing the axis of observation to an angle of observation with respect to the perpendicular axis (P) in an independent way.

7. The apparatus according to claim 1, wherein the XRF-control module of said x-ray fluorescence apparatus is further configured for
modifying an intensity of a current in order to modify an intensity of said first x-ray beam (XB, XBC).

8. A method of quality control on industrial production lines, comprising:
providing an apparatus according to claim 1;
defining a set of significant parameters that enables recognition of one or more samples (C, C', 12) of product being processed in a given time interval;
receiving at least two signals (Y) from among said first received signal (Y1), said second received signal (Y2), and said third received signal (Y3, YZ); and
analysing said at least two signals (Y) as a function of said set of significant parameters,
wherein the method comprises driving said x-ray source and said optical-radiation source to emit, respectively, an x-ray beam (XB, XBC) towards a product sample (C) and an optical-radiation beam towards a product sample (C) at one and the same time,
wherein the method comprises driving said monochromatic environmental light source configured for illuminating said measurement environment with blue monochromatic environmental light.

9. The method according to claim 8, wherein controlling said XRF apparatus via at least one of the following:
a value of length of a geometrical dimension of the object measured via the vision apparatus; and
a composition of an object the presence or absence of which is detected via the optical-spectroscopy apparatus.

10. The method according to claim 8, wherein controlling a current intensity in order to modify an intensity of said first x-ray beam (XB) as a function of said at least two signals (Y) from among said first received signal (Y1), said second received signal (Y2), and said third received signal (Y3; YZ).

11. The method according to claim 8,
comprising
filtering said second received signal (Y2) and said third received signal (Y3; YZ) comprising removing a background.

12. The method according to claim 8, wherein said products (C, C', 12) are foodstuff products and said industrial production line is a foodstuff-packaging line.

13. A computer program product that can be loaded into the memory of at least one processing device and includes portions of software code for executing the steps of the method according to claim 8 when the product is run on at least one processing device.

14. The apparatus according to claim 1, wherein the one or more apparatuses for the measurement of properties of a product sample (C) comprise the optical-spectroscopy apparatus operating in the band of the near infrared.

15. The apparatus according to claim 1, wherein the apparatus comprises a module for measuring the depth of the surface of the product sample, wherein the module is an optical interferometer of which an axis of measurement is perpendicular to the plane of the product sample and is used for measuring the depth of the profile of the surface of the product sample.

16. The apparatus according to claim 1, wherein the apparatus is configured to vary the angle between the x-ray source and the particle detector via the information on the profile of the surface of the product sample obtained from the module, varying the angle as a function of the defects of the sample which vary in the course of measurement as the product is moving, for following the product along the axis of movement.

17. The apparatus according to claim 16, wherein the module is an interferometer.

* * * * *